United States Patent
Mashima et al.

(10) Patent No.: US 10,865,302 B2
(45) Date of Patent: Dec. 15, 2020

(54) RESIN COMPOSITION AND USE THEREOF

(71) Applicant: ZEON CORPORATION, Tokyo (JP)

(72) Inventors: Hiromu Mashima, Tokyo (JP);
Takamichi Inomata, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/070,586

(22) PCT Filed: Jan. 10, 2017

(86) PCT No.: PCT/JP2017/000432
§ 371 (c)(1),
(2) Date: Jul. 17, 2018

(87) PCT Pub. No.: WO2017/130681
PCT Pub. Date: Aug. 3, 2017

(65) Prior Publication Data
US 2019/0040249 A1 Feb. 7, 2019

(30) Foreign Application Priority Data

Jan. 29, 2016 (JP) ................. 2016-016379

(51) Int. Cl.
| | | |
|---|---|---|
| *C08L 53/02* | (2006.01) | |
| *C08J 5/18* | (2006.01) | |
| *C08K 5/01* | (2006.01) | |
| *C08K 5/10* | (2006.01) | |
| *C08K 5/00* | (2006.01) | |
| *B29C 55/04* | (2006.01) | |
| *C08F 8/04* | (2006.01) | |
| *C08F 297/04* | (2006.01) | |
| *G02B 5/30* | (2006.01) | |

(52) U.S. Cl.
CPC ............ *C08L 53/025* (2013.01); *B29C 55/04* (2013.01); *C08F 8/04* (2013.01); *C08F 297/046* (2013.01); *C08J 5/18* (2013.01); *C08K 5/0016* (2013.01); *C08K 5/01* (2013.01); *C08K 5/10* (2013.01); *G02B 5/3033* (2013.01); *C08F 2810/20* (2013.01); *C08J 2353/02* (2013.01); *C08L 2203/16* (2013.01)

(58) Field of Classification Search
CPC ........ C08L 53/025; C08F 297/04; C08F 8/04; C08K 5/0016
See application file for complete search history.

(56) References Cited

U.S. PATENT DOCUMENTS

| | | | |
|---|---|---|---|
| 6,958,394 B2 | 10/2005 | Saito | |
| 2005/0266258 A1 | 12/2005 | Saito | |
| 2013/0008506 A1 | 1/2013 | Tanahashi et al. | |
| 2014/0011929 A1 | 1/2014 | Knoll et al. | |
| 2015/0197588 A1* | 7/2015 | Uehara ................... | C08F 36/22 525/321 |
| 2017/0052299 A1 | 2/2017 | Ogomi et al. | |

FOREIGN PATENT DOCUMENTS

| | | |
|---|---|---|
| EP | 2623526 B1 | 7/2017 |
| JP | 2003012823 A | 1/2003 |
| JP | 2005206669 A | 8/2005 |
| JP | 2006283010 A | 10/2006 |
| JP | 2014500377 A | 1/2014 |
| JP | 2015215610 A | 12/2015 |
| WO | 2011096389 A1 | 8/2011 |
| WO | 2012043708 A1 | 4/2012 |

OTHER PUBLICATIONS

Jul. 31, 2018, International Preliminary Report on Patentability issued in the International Patent Application No. PCT/JP2017/000432.

Apr. 4, 2017, International Search Report issued in the International Patent Application No. PCT/JP2017/000432.

* cited by examiner

*Primary Examiner* — Jeffrey C Mullis
(74) *Attorney, Agent, or Firm* — Kenja IP Law PC

(57) ABSTRACT

A resin composition including a hydrogenated block copolymer product [D] and a plasticizer, wherein: the hydrogenated product [D] is a hydrogenated product obtained by hydrogenating a block copolymer [C] composed of a polymer block [A] containing a repeating unit [I] derived from an aromatic vinyl compound as a main component, and a polymer block [B] containing the repeating unit [I] derived from an aromatic vinyl compound and a repeating unit [II] derived from a chain conjugated diene compound as main components; a ratio of the block [A] and the block [B], and a ratio of the unit [I] and the unit [II] are in specific ranges, and, in the hydrogenated product [D], 90% or more of all unsaturated bonds in the block copolymer [C] are hydrogenated.

11 Claims, No Drawings

RESIN COMPOSITION AND USE THEREOF

FIELD

The present invention relates to a resin composition and a film that can be usefully used for producing a polarizing plate, and a polarizing plate.

BACKGROUND

A display device, such as a liquid crystal display device and an organic electroluminescent display device, is required to be larger in display area, lighter in weight, and thinner in thickness than ever before. Accordingly, a panel constituting the display device is also required to be thinner than ever before.

As the display device, a polarizing plate including a polarizer and a protective film for protecting the polarizer is generally used. The polarizing plate is also required to be thinner so as to constitute a thin display device. In particular, a material generally used for the polarizer, such as a polyvinyl alcohol, may shrink in a using environment of the display device, and warping caused by such shrinkage may become an issue in a thin display device having a large area. Accordingly, it is expected that employment of a thin polarizer having a thickness of 10 μm or less can not only reduce the thickness of the display device by the reduction in the thickness of the polarizer itself, but also decrease the occurrence of the warping.

However, if such a thin polarizer is produced from the polyvinyl alcohol with a prior art production method, melt split of the polarizer frequently occurs. Addressing thereto, several methods have been proposed as a method for producing a polarizing plate including a thin polarizer without causing melt split of the polarizer. For example, Patent Literature 1 discloses a method in which a multilayer film is prepared by bonding a polyvinyl alcohol layer to a substrate such as a non-crystallizable polyethylene terephthalate, the multilayer film is subjected to a production step of a polarizer including wet stretching, and then the substrate is peeled off from the multilayer film.

CITATION LIST

Patent Literature

Patent Literature 1: Japanese Patent Application Laid-Open No. 2015-215610 A

SUMMARY

Technical Problem

In the method described in Patent Literature 1, the substrate is discarded after being peeled off, leading to a poor production efficiency.

In order to improve the production efficiency, the substrate may possibly be left unpeeled on the polarizer, to use the substrate as it is as a protective film for a polarizer in the product. However, such a configuration requires a substrate that can exhibit optical properties usable as a protective film for a polarizer even after being subjected to the production step of the polarizer including the wet stretching. Specifically, there is a need for a material that exhibits a sufficiently low phase difference even after being subjected to an operation, such as stretching at a ratio of 1.2 to 6.0 times at 50 to 100° C., in the wet stretching. There has been no success in finding out such a material of the substrate.

Thus, an object of the present invention is to provide a resin composition and a film allowing for an efficient production of a polarizing plate and a polarizing plate that can be efficiently produced.

Solution to Problem

Through a study conducted for solving the aforementioned problem, the present inventor have found that the aforementioned problem could be solved by a resin composition including a specific block copolymer and a plasticizer, thereby completing the present invention. As a result, according to the present invention, the following (1) to (9) are provided.

(1) A resin composition comprising a hydrogenated block copolymer product [D] and a plasticizer, wherein:
the hydrogenated block copolymer product [D] is a hydrogenated block copolymer product obtained by hydrogenating a block copolymer [C], the block copolymer [C] being composed of
a polymer block [A] containing a repeating unit [I] derived from an aromatic vinyl compound as a main component, and
a polymer block [B] containing the repeating unit [I] derived from an aromatic vinyl compound and a repeating unit [II] derived from a chain conjugated diene compound as main components;
(i) a ratio (wA/wB) of wA to wB is 45/55 to 85/15 where the wA is a weight fraction of the polymer block [A] in the block copolymer block [C] and the wB is a weight fraction of the polymer block [B] in the block copolymer block [C];
(ii) a ratio (w[IB]/w[IIB]) of w[IB] to w[IIB] is 40/60 to 55/45 where the w[IB] is a weight fraction of the repeating unit [I] in the polymer block [B] and the w[IIB] is a weight fraction of the repeating unit [II] in the polymer block [B]; and
(iii) in the hydrogenated block copolymer product [D], 90% or more of all unsaturated bonds in the block copolymer [C] are hydrogenated.

(2) The resin composition according to (1), having a heat deformation temperature of 115° C. or lower.

(3) The resin composition according to (1) or (2), wherein the plasticizer is an ester-based plasticizer, an aliphatic hydrocarbon-based polymer or a mixture thereof.

(4) A film formed from the resin composition according to any one of (1) to (3).

(5) The film according to (4), being a stretched film.

(6) The film according to (4) or (5), wherein a birefringence can be 0.001 or less, the birefringence being expressed by subjecting the film to a free-end uniaxial stretching at a temperature in a range of 50° C. to 100° C. and a stretching ratio in a range of 1.2 to 6.0.

(7) The film according to any one of (4) to (6), wherein a maximum tension can be 10 N/10 mm or less, the maximum tension being caused by subjecting the film to a free-end uniaxial stretching at a temperature in a range of 50° C. to 100° C. and a stretching ratio in a range of 1.2 to 6.0.

(8) The film according to (5), having Re of 20 nm or less, and Rth of −10 nm or more and 10 nm or less.

(9) A polarizing plate comprising the film according to any one of (4) to (8) as a protective film.

Advantageous Effects of Invention

The film of the present invention formed from the resin composition of the present invention can serve as a material that exhibits a sufficiently low phase difference even after being subjected to the production step of a polarizer including the wet stretching, thereby enabling efficient production of a high-quality polarizing plate. Further, according to the polarizing plate of the present invention, a high-quality polarizing plate can be efficiently produced.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the present application, a "long-length" film means a film having a length that is 5 or more times the width of the film, and preferably a length that is 10 or more times the width, and specifically means a film having a length that allows the film to be wound up into a roll shape and stored or transported. The upper limit of a ratio of the film length with respect to the film width is not particularly limited, however, it may be set to, for example, 100,000 times or less.

In the present application, an in-plane retardation Re and a thickness direction retardation Rth of a layer or film are calculated according to formulas, Re=(nx−ny)×d and Rth=[{(nx+ny)/2}−nz]×d, respectively. In the formulas, nx represents a refractive index in a slow axis direction in a plane of the object to be measured (the maximum refractive index in a plane), ny represents a refractive index in a direction which is perpendicular to the slow axis in the plane of the object to be measured, nz represents a refractive index in a thickness direction of the object to be measured, and d represents the thickness (nm) of the object to be measured. The measuring wavelength is 590 nm unless otherwise specified.

[1. Resin Composition]

The resin composition of the present invention includes a specific hydrogenated block copolymer product [D] and a plasticizer. The hydrogenated block copolymer product [D] is a hydrogenated product of a block copolymer [C]. The block copolymer [C] is a copolymer composed of a specific polymer block [A] and a specific polymer block [B].

[1.1. Polymer Block [A]]

The polymer block [A] contains a repeating unit [I] derived from an aromatic vinyl compound as a main component.

The content ratio of the repeating unit [I] derived from an aromatic vinyl compound in the polymer block [A] is usually 98% by weight or more, and preferably 99% by weight or more.

Examples of a repeating unit in the polymer block [A] other than the repeating unit [I] derived from an aromatic vinyl compound may include a repeating unit [II] derived from a chain conjugated diene and/or a repeating unit [III] derived from another vinyl compound (that is, a vinyl compound that is neither the aromatic vinyl compound nor the chain conjugated diene compound). The content ratio thereof is 2% by weight or less, and preferably 1% by weight or less. When the content ratio of the repeating unit [II] and/or the repeating unit [III] in the polymer block [A] falls within such a low range, the glass transition temperature Tg2 of a hard segment of the hydrogenated block copolymer product [D] can be maintained at a high level. This can make heat resistance of the resin composition of the present invention favorable.

[1.2. Polymer Block [B]]

The polymer block [B] contains the repeating unit [I] derived from an aromatic vinyl compound and the repeating unit [II] derived from a chain conjugated diene compound as main components.

A weight fraction w[IB] of the repeating unit [I] in the polymer block [B] and a weight fraction w[IIB] of the repeating unit [II] in the polymer block [B] have a specific ratio with respect to each other. That is, the ratio of w[IB] to w[IIB] (w[IB]/w[IIB]) is 40/60 or higher, preferably 45/55 or higher, and more preferably 50/50 or higher, and is 55/45 or lower, preferably 54/46 or lower, and more preferably 53/47 or lower.

When w[IB]/w[IIB] falls within the aforementioned range, the resin composition can serve as a material that exhibits a sufficiently low phase difference even after being subjected to the production step of a polarizer including the wet stretching. Further, when the relative ratio of the repeating unit [I] in the polymer block [B] is equal to or more than the lower limit of the aforementioned range, a glass transition temperature Tg1 of a soft segment of the hydrogenated block copolymer product [D] can be maintained at a high level. Thus, heat resistance of the resin composition of the present invention can be made favorable. On the other hand, when the relative ratio of the repeating unit [I] in the polymer block [B] is equal to or less than the upper limit of the aforementioned range, Tg1 and Tg2 of the hydrogenated block copolymer product [D] can be clearly distinguished from each other. The resin composition of the present invention including such blocks exhibits two different glass transition temperatures (Tg) attributable to respective blocks. Thus, heat resistance of the resin composition can be made favorable.

The total content of the repeating unit [I] and the repeating unit [II] in the polymer block [B] is 95% by weight or more, preferably 97% by weight or more, and more preferably 99% by weight or more.

Examples of a component in the polymer block [B] other than the repeating unit [I] and the repeating unit [II] may include the repeating unit [III] derived from another vinyl compound. The content thereof is 5% by weight or less, preferably 3% by weight or less, and more preferably 1% by weight or less. When the content ratios of the repeating unit [I] and the repeating unit [II] in the polymer block [B] fall within the aforementioned range, the hydrogenated block copolymer product [D] of the present invention and the stretched film made therefrom can maintain mechanical strength and flexibility and can have an improved heat resistance with respect to phase difference change.

[1.3. Aromatic Vinyl Compound]

The repeating unit [I] is a unit derived from an aromatic vinyl compound. In the present application, a unit derived from a compound refers to a unit having a structure obtainable by polymerization of the compound. Examples of the aromatic vinyl compound may include styrene; styrenes having an alkyl group of 1 to 6 carbon atoms as a substituent, such as α-methylstyrene, 2-methylstyrene, 3-methylstyrene, 4-methylstyrene, 2,4-diisopropylstyrene, 2,4-dimethylstyrene, 4-t-butylstyrene, and 5-t-butyl-2-methylstyrene; styrenes having a halogen atom as a substituent, such as 4-chlorostyrene, dichlorostyrene, and 4-monofluorostyrene; styrenes having an alkoxy group of 1 to 6 carbon atoms as a substituent, such as 4-methoxystyrene; styrenes having an aryl group as a substituent, such as 4-phenylstyrene; and vinylnaphthalenes, such as 1-vinylnaphthalene and 2-vinylnaphthalene. Of these, aromatic vinyl compounds having no polar group, such as styrene and the styrenes having an alkyl group of 1 to 6 carbon atoms as a substituent, are preferable from the viewpoint of hygroscopicity, and styrene is particularly preferable because it is easily available on an industrial scale.

[1.4. Chain Conjugated Diene Compound]

The repeating unit [II] is a unit derived from a chain conjugated diene compound. Examples of the chain conjugated diene compound may include 1,3-butadiene, isoprene, 2,3-dimethyl-1,3-butadiene, and 1,3-pentadiene. Of these, chain conjugated dienes compound having no polar group are preferable from the viewpoint of hygroscopicity, and 1,3-butadiene and isoprene are particularly preferable because they are easily available on an industrial scale.

[1.5. Other Vinyl Compound]

The repeating unit [III] is a repeating unit derived from a vinyl compound that is neither the aromatic vinyl compound nor the chain conjugated diene compound. Examples of such a compound may include a chain olefin compound, a cyclic olefin compound, an unsaturated cyclic anhydride, and an unsaturated imide compound. These compounds may have a nitrile group, an alkoxycarbonyl group, a hydroxycarbonyl group, or a halogen atom as a substituent.

Of these, from the viewpoint of hygroscopicity, preferable are those having no polar group such as the chain olefin compound of 2 to 20 carbon atoms per molecule, such as ethylene, propylene, 1-butene, 1-pentene, 1-hexene, 1-heptene, 1-octen, 1-nonene, 1-decene, 1-dodecene, 1-eicosene, 4-methyl-1-pentene, and 4,6-dimethyl-1-heptene; and the cyclic olefin compound of 5 to 20 carbon atoms per molecule, such as vinylcyclohexane, 4-vinylcyclohexene, and norbornene. Of these, the chain olefin compounds of 2 to 20 carbon atoms per molecule are more preferable and ethylene and propylene are particularly preferable.

[1.6. Block Copolymer [C]]

In a preferable example, the numbers of the polymer block [A] and the polymer block [B] included in one molecule of the block copolymer [C] are usually 2 for the polymer block [A] and 1 for the polymer block [B]. Thus, the block copolymer [C] usually has a triblock structure of [A]-[B]-[A]. However, the structure of the block copolymer [C] is not limited to the triblock structure and the block copolymer [C] may have, for example, a pentablock structure of [A]-[B]-[A]-[B]-[A].

When one molecule of the block copolymer [C] contains two polymer blocks [A], these polymer blocks [A] may be the same as or different from each other. The weight-average molecular weights of two polymer blocks [A] included in one molecule of the block copolymer [C] may be the same as or different from each other. The weight-average molecular weight Mw(A) of each of the polymer blocks [A] is 3,000 to 90,000, preferably 3,500 to 80,000, and more preferably 4,000 to 60,000.

When Mw(A) of the polymer block [A] is 3,000 or more, the hydrogenated block copolymer product [D] can exhibit favorable mechanical strength. On the other hand, when Mw(A) of the polymer block [A] is 90,000 or less, the hydrogenated block copolymer product [D] can exhibit favorable melt moldability.

A weight fraction wA of the polymer blocks [A] in the block copolymer [C] and a weight fraction wB of the polymer blocks [B] in the block copolymer [C] have a specific ratio with respect to each other. That is, the ratio of wA to wB (wA/wB) is 45/55 or higher, preferably 50/50 or higher, more preferably 55/45 or higher, and 85/15 or lower, preferably 80/20 or lower, and more preferably 75/25 or lower. When wA/wB falls within the aforementioned range, the resin composition can serve as a material that exhibits a sufficiently low phase difference even after being subjected to the production step of a polarizer including the wet stretching. Further, when wA/wB is equal to or lower than the upper limit of the aforementioned range, flexibility and favorable mechanical strength can be imparted to the hydrogenated block copolymer product [D]. When wA/wB is equal to or higher than the lower limit of the aforementioned range, favorable heat resistance can be imparted to the hydrogenated block copolymer product [D].

The molecular weight of the block copolymer [C], which is measured as a polystyrene-equivalent weight-average molecular weight (Mw) by gel permeation chromatography (GPC) using tetrahydrofuran (THF) as a solvent, is preferably 50,000 or more, more preferably 55,000 or more, and further more preferably 60,000 or more, and is preferably 150,000 or less, more preferably 130,000 or less, and further more preferably 100,000 or less. The molecular weight distribution (Mw/Mn) of the block copolymer [C] is preferably 3 or less, more preferably 2 or less, and particularly preferably 1.5 or less.

The block copolymer [C] may be produced, for example, by means of living anionic polymerization or the like, such as a method in which a monomer mixture (a) containing the aromatic vinyl compound as a main component and a monomer mixture (b) containing the aromatic vinyl compound and the chain conjugated diene compound as main components are alternately polymerized; and a method in which the monomer mixture (a) containing the aromatic vinyl compound as a main component and the monomer mixture (b) containing the aromatic vinyl compound and the chain conjugated diene compound as main components are sequentially polymerized, and then terminals of the polymer blocks [B] are coupled to each other using a coupling agent.

In the step of polymerizing the monomer mixture (b) to form the copolymer block [B], it is preferable that small quantity of the monomer mixture (b) is continuously supplied to a polymerization reaction system. In this manner, the copolymer block [B] having a homogeneous monomer composition can be formed even if the aromatic vinyl compound and the chain conjugated diene compound have significantly different speed of polymerization. In this manner, Tg1 of the soft segment of the hydrogenated block copolymer product [D] can be confined within a preferable range, such as 0° C. or higher.

If the monomer mixture (b) is quickly supplied to the polymerization reaction system, the chain conjugated diene having a faster polymerization speed is preferentially polymerized, so that the polymer block [B] may be formed in a tapered block. As a result, Tg1 of the soft segment of the hydrogenated block copolymer product [D] may become below 0° C., whereby heat resistance of the hydrogenated block copolymer product [D] may be deteriorated.

[1.7. Hydrogenated Block Copolymer Product [D]]

The hydrogenated block copolymer product [D] may be obtained by hydrogenating a carbon-carbon unsaturated bond in a main chain and a side chain, as well as a carbon-carbon unsaturated bond in an aromatic ring, in the block copolymer [C]. The polymer blocks obtained by hydrogenating the polymer block [A] and the polymer block [B] in the block copolymer [C] constitute the hard segment and the soft segment, respectively, in the hydrogenated block copolymer product [D].

The hydrogenation rate of the hydrogenated block copolymer product [D] is 90% or more, preferably 95% or more, more preferably 97% or more, and further more preferably 99% or more. The upper limit of the hydrogenation rate is ideally 100%. The hydrogenation rate of the hydrogenated block copolymer product [D] is a ratio of hydrogenated carbon-carbon bonds relative to the total of carbon-carbon unsaturated bonds of the aromatic rings included in the repeating units derived from the aromatic vinyl compound and carbon-carbon unsaturated bonds included in the repeating units derived from the chain conjugated diene in the block copolymer [C]. As the hydrogenation rate is higher, the molded product exhibits better weather resistance, heat resistance, and transparency. The hydrogenation rate of the hydrogenated block copolymer product [D] may be obtained by $^1$H-NMR, GPC in which peak areas detected by a UV detector and an RI detector are compared, or the like.

The method for hydrogenating unsaturated bonds and a reaction form of hydrogenation are not particularly limited and the hydrogenation reaction may be performed in accordance with a known method. The preferable hydrogenation method is a method which can achieve a high hydrogenation rate while causing few polymer chain cleavage reactions. Examples of such a hydrogenation method may include a method described in WO2011/096389 and a method described in WO2012/043708.

After the hydrogenation reaction is completed, the hydrogenation catalyst and/or the polymerization catalyst are removed from the reaction solution and the hydrogenated block copolymer product [D] can be collected from the resulting solution. The hydrogenated block copolymer product [D], which is usually formed as a pellet, may be subjected to a subsequent operation.

The molecular weight of the hydrogenated block copolymer product [D] measured as a polystyrene-equivalent weight-average molecular weight (Mw) by GPC using THF as a solvent is preferably 50,000 or more, more preferably 55,000 or more, and further more preferably 60,000 or more, and is preferably 150,000 or less, more preferably 130,000 or less, and further more preferably 100,000 or less. The molecular weight distribution (Mw/Mn) of the hydrogenated block copolymer product [D] is preferably 3 or less, more preferably 2 or less, and particularly preferably 1.5 or less. When Mw and Mw/Mn fall within the aforementioned respective ranges, the molded stretched film exhibits favorable heat resistance with respect to phase difference change and favorable mechanical strength.

[1.8. Plasticizer]

As the plasticizer, those that is capable of being uniformly dissolved or dispersed in the hydrogenated block copolymer product [D] may be used. Examples of the plasticizer may include an ester-based plasticizer, such as an ester-based plasticizer made from a polyhydric alcohol and a univalent carboxylic acid (hereinafter referred to as a "polyhydric alcohol ester-based plasticizer") and an ester-based plasticizer made from a polyvalent carboxylic acid and a monohydric alcohol (hereinafter referred to as a "polyvalent carboxylic acid ester-based plasticizer"); a phosphoric acid ester-based plasticizer; a carbohydrate ester-based plasticizer, such as an aliphatic hydrocarbon-based polymer; and other polymer plasticizers. Of these, the ester-based plasticizer, the aliphatic hydrocarbon-based polymer, and a mixture thereof are particularly preferable.

Examples of the polyhydric alcohol that serves as a raw material of the ester-based plasticizer preferably used in the present invention may include the followings, although the present invention is not limited thereto. Exemplified are adonitol, arabitol, ethylene glycol, glycerol, diglycerol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, ditrimethylolpropane, trimethylolethane, pentaerythritol, dipentaerythritol, and xylitol. Ethylene glycol, glycerol, and trimethylolpropane are particularly preferable.

Examples of the polyhydric alcohol ester-based plasticizer may include an ethylene glycol ester-based plasticizer, a glycerol ester-based plasticizer, and other polyhydric alcohol ester-based plasticizers. Specific examples of the ethylene glycol ester-based plasticizer may include an ethylene glycol alkyl ester-based plasticizer, such as ethylene glycol diacetate and ethylene glycol dibutyrate, an ethylene glycol cycloalkyl ester-based plasticizer, such as ethylene glycol dicyclopropyl carboxylate and ethylene glycol dicyclohexyl carboxylate, and an ethylene glycol aryl ester-based plasticizer, such as ethylene glycol dibenzoate and ethylene glycol di-4-methylbenzoate. Alkylate groups, cycloalkylate groups, and arylate groups, which constitute these plasticizers, may be the same as or different from each other and may be further substituted. Further, the plasticizer may be constituted by a combination of the alkylate groups, the cycloalkylate groups, and the arylate groups. Further, these substituents may be covalently bonded to each other. Further, the ethylene glycol portion may also be substituted and a part of the ethylene glycol ester structure may be partially or regularly incorporated into the polymer as a pendant. Further, it may be incorporated into a part of a molecular structure of an additive, such as an antioxidant, an acid scavenger, and an ultraviolet absorber.

Specific examples of the glycerol ester-based plasticizer may include a glycerol alkyl ester, such as triacetin, tributylin, glycerol diacetate caprylate, and glycerol oleate propionate; a glycerol cycloalkyl ester, such as glycerol tricyclopropyl carboxylate and glycerol tricyclohexyl carboxylate; a glycerol aryl ester, such as glycerol tribenzoate and glycerol 4-methylbenzoate; a diglycerol alkyl ester, such as diglycerol tetraacetylate, diglycerol tetrapropionate, diglycerol acetate tricaprylate, and diglycerol tetralaurate; a diglycerol cycloalkyl ester, such as diglycerol tetracyclobutyl carboxylate and diglycerol tetracyclopentyl carboxylate; and a diglycerol aryl ester, such as diglycerol tetrabenzoate and diglycerol 3-methylbenzoate. Alkylate groups, cycloalkyl carboxylate groups, and arylate groups, which constitute these plasticizers, may be the same as or different from each other and may be further substituted. Further, the plasticizer may be constituted by a combination of the alkylate groups, the cycloalkyl carboxylate groups, and the arylate groups. Further, these substituents may be covalently bonded to each other. Further, the glycerol and diglycerol portions may also be substituted and a part of the glycerol ester and diglycerol ester structures may be partially or regularly incorporated into the polymer as a pendant. Further, they may be incorporated into a part of a molecular structure of an additive, such as an antioxidant, an acid scavenger, and an ultraviolet absorber.

Specific examples of other polyhydric alcohol ester-based plasticizers may include the polyhydric alcohol ester-based plasticizers described in paragraphs [0030] to [0033] of Japanese Patent Application Laid-Open No. 2003-12823 A.

Alkylate groups, cycloalkyl carboxylate groups, and arylate groups, which constitute these plasticizers, may be the same as or different from each other and may be further substituted. Further, the plasticizer may be constituted by a combination of the alkylate groups, the cycloalkyl carboxylate groups, and the arylate groups. Further, these substituents may be covalently bonded to each other. Further, the polyhydric alcohol portion may also be substituted and a part of the polyhydric alcohol structure may be partially or regularly incorporated into the polymer as a pendant. Further, it may be incorporated into a part of a molecular structure of an additive, such as an antioxidant, an acid scavenger, and an ultraviolet absorber.

Examples of the polyvalent carboxylic acid ester-based plasticizer may include a dicarboxylic acid ester-based plasticizer and other polyvalent carboxylic acid ester-based plasticizers. Specific examples of the dicarboxylic acid ester-based plasticizer may include an alkyldicarboxylic acid alkyl ester-based plasticizer, such as didodecyl malonate, dioctyl adipate, and dibutyl sebacate; an alkyldicarboxylic acid cycloalkyl ester-based plasticizer, such as dicyclopentyl succinate and dicyclohexyl adipate; an alkyldicarboxylic acid aryl ester-based plasticizer, such as diphenyl succinate and di-4-methylphenyl glutarate; a cycloalkyl dicarboxylic acid alkyl ester-based plasticizer, such as dihexyl-1,4-cyclohexanedicarboxylate and didecyl bicyclo[2.2.1]heptane-2,3-dicarboxylate; a cycloalkyl dicarboxylic acid cycloalkyl ester-based plasticizer, such as dicyclohexyl-1,2-cyclobutanedicarboxylate and dicyclopropyl-1,2-cyclohexyldicarboxylate; a cycloalkyl dicarboxylic acid aryl ester-based plasticizer, such as diphenyl-1,1-cyclopropyldicarboxylate and di-2-naphthyl-1,4-cyclohexanedicarboxylate; an aryldicarboxylic acid alkyl ester-based plasticizer, such as diethyl phthalate, dimethyl phthalate, dioctyl phthalate, dibutyl phthalate, and di-2-ethylhexyl phthalate; an aryldicarboxylic acid cycloalkyl ester-based plasticizer, such as dicyclopropyl phthalate and dicyclohexyl phthalate; and an aryldicarboxylic acid aryl ester-based plasticizer, such as diphenyl phthalate and di-4-methylphenyl phthalate.

Alkoxy groups and cycloalkoxy groups, which constitute these plasticizers, may be the same as or different from each other and may be monosubstituted. These substituents may be further substituted. The plasticizer may be constituted by a combination of alkyl groups and cycloalkyl groups. Further, these substituents may be covalently bonded to each other. Further, an aromatic ring of the phthalic acid constituting these plasticizers may also be substituted and may form a multimer, such as a dimer, trimer, or tetramer. Further, a part of the phthalic acid ester structure may be partially or regularly incorporated into the polymer as a pendant. It may be incorporated into a part of a molecular structure of an additive, such as an antioxidant, an acid scavenger, and an ultraviolet absorber.

Specific examples of other polyvalent carboxylic acid ester-based plasticizers may include an alkyl polyvalent carboxylic acid alkyl ester-based plasticizer, such as tridodecyl tricarbarate and tributyl-meso-butane-1,2,3,4-tetracarboxylate; an alkyl polyvalent carboxylic acid cycloalkyl ester-based plasticizer, such as tricyclohexyl tricarbarate and tricyclopropyl-2-hydroxy-1,2,3-propanetricarboxylate; an alkyl polyvalent carboxylic acid aryl ester-based plasticizer, such as triphenyl 2-hydroxy-1,2,3-propanetricarboxylate and tetra-3-methylphenyl tetrahydrofurane-2,3,4,5-tetracarboxylate; a cycloalkyl polyvalent carboxylic acid alkyl ester-based plasticizer, such as tetrahexyl-1,2,3,4-cyclobutanetetracarboxylate and tetrabutyl-1,2,3,4-cyclopentanetetracarboxylate; a cycloalkyl polyvalent carboxylic acid cycloalkyl ester-based plasticizer, such as tetracyclopropyl-1,2,3,4-cyclobutanetetracarboxylate and tricyclohexyl-1,3,5-cyclohexyltricarboxylate; a cycloalkyl polyvalent carboxylic acid aryl ester-based plasticizer, such as triphenyl-1,3,5-cyclohexyltricarboxylate and hexa-4-methylphenyl-1,2,3,4,5,6-cyclohexylhexacarboxylate; an aryl polyvalent carboxylic acid alkyl ester-based plasticizer, such as tridodecyl benzene-1,2,4-tricarboxylate and tetraoctyl benzene-1,2,4,5-tetracarboxylate; an aryl polyvalent carboxylic acid cycloalkyl ester-based plasticizer, such as tricyclopentyl benzene-1,3,5-tricarboxylate and tetracyclohexyl benzene-1,2,3,5-tetracarboxylate; and an aryl polyvalent carboxylic acid aryl ester-based plasticizer, such as triphenyl benzene-1,3,5-tetracarboxylate and hexa-4-methylphenyl benzene-1,2,3,4,5,6-hexacarboxylate. Alkoxy groups and cycloalkoxy groups, which constitute these plasticizers, may be the same as or different from each other and may be monosubstituted. These substituents may be further substituted. The plasticizer may be constituted by a combination of alkyl groups and cycloalkyl groups. Further, these substituents may be covalently bonded to each other. Further, an aromatic ring of the phthalic acid constituting these plasticizers may also be substituted and form a multimer, such as a dimer, trimer, or tetramer. Further, a part of the phthalic acid ester structure may be partially or regularly incorporated into the polymer as a pendant. It may be incorporated into a part of a molecular structure of an additive, such as an antioxidant, an acid scavenger, and an ultraviolet absorber.

Specific examples of the phosphoric acid ester-based plasticizer may include a phosphoric acid alkyl ester, such as triacetyl phosphate and tributyl phosphate; a phosphoric acid cycloalkyl ester, such as tricyclopentyl phosphate and cyclohexyl phosphate; and a phosphoric acid aryl ester, such as triphenyl phosphate, tricresyl phosphate, cresylphenyl phosphate, octyldiphenyl phosphate, diphenylbiphenyl phosphate, trioctyl phosphate, tributyl phosphate, trinaphthyl phosphate, trixylyl phosphate, and tris-ortho-biphenyl phosphate. The substituents constituting these plasticizers may be the same as or different from each other and may be further substituted. Further, the plasticizer may be constituted by a combination of alkyl groups, cycloalkyl groups, and aryl groups. Further, the substituents may be covalently bonded to each other.

Further, examples of the phosphoric acid ester may include an alkylenebis(dialkyl phosphate), such as ethylenebis(dimethyl phosphate) and butylenebis(diethyl phosphate); an alkylenebis(diaryl phosphate), such as ethylenebis(diphenyl phosphate) and propylenebis(dinaphthyl phosphate); an arylenebis(dialkyl phosphate), such as phenylenebis(dibutyl phosphate) and biphenylenebis(dioctyl phosphate); and an arylenebis(diaryl phosphate), such as phenylenebis(diphenyl phosphate) and naphthylenebis(ditolyl phosphate). The substituents constituting these plasticizers may be the same as or different from each other and may be further substituted. Further, the plasticizer may be constituted by a combination of alkyl groups, cycloalkyl groups, and aryl groups. Further, the substituents may be covalently bonded to each other.

Further, a part of the phosphoric acid ester structure may be partially or regularly incorporated into the polymer as a pendant. Further, it may be incorporated into a part of a molecular structure of an additive, such as an antioxidant, an acid scavenger, and an ultraviolet absorber. Of the aforementioned compounds, the phosphoric acid aryl ester and the arylenebis(diaryl phosphate) are preferable, and, specifically, triphenyl phosphate and phenylenebis(diphenyl phosphate) are preferable.

Subsequently, the carbohydrate ester-based plasticizer will be described. The carbohydrate refers to a monosaccharide, disaccharide, or trisaccharide, in which each saccharide exists in a form of pyranose or furanose (a 6-membered ring or 5-membered ring). Non-limiting examples of the carbohydrate may include glucose, saccharose, lactose, cellobiose, mannose, xylose, ribose, galactose, arabinose, fructose, sorbose, cellotriose, and raffinose. The carbohydrate ester refers to an ester compound formed by dehydration condensation between a hydroxyl group of the carbohydrate and a carboxylic acid, and specifically refers to an aliphatic carboxylic acid ester or aromatic carboxylic acid ester of the carbohydrate. Examples of the aliphatic carboxylic acid may include acetic acid, and propionic acid. Examples of the aromatic carboxylic acid may include benzoic acid, toluic acid, and anisic acid. A carbohydrate has hydroxyl groups, and the number of the hydroxyl groups depends on the type of the carbohydrate, although a part of the hydroxyl groups may undergo a reaction with a carboxylic acid to form an ester compound, or all of the hydroxyl groups may undergo a reaction with a carboxylic acid to form an ester compound. In the present invention, it is preferable that all of the hydroxyl groups undergo a reaction with the carboxylic acid to form an ester compound.

Specific examples of the carbohydrate ester-based plasticizer may preferably include glucose pentaacetate, glucose pentapropionate, glucose pentabutyrate, saccharose octaacetate, and saccharose octabenzoate. Of these, saccharose octaacetate is more preferable.

Specific examples of the polymer plasticizer may include an aliphatic hydrocarbon-based polymer; an alicyclic hydrocarbon-based polymer; an acrylic polymer, such as polyethyl acrylate, polymethyl methacrylate, a copolymer of methyl methacrylate and 2-hydroxyethyl methacrylate, and a copolymer of methyl methacrylate, methyl acrylate, and 2-hydroxyethyl methacrylate; a vinyl-based polymer, such as polyvinyl isobutyl ether and poly-N-vinylpyrrolidone; a styrene-based polymer, such as polystyrene and poly-4-hydroxystyrene; a polyester, such as polybutylene succinate, polyethylene terephthalate, and polyethylene naphthalate; a polyether, such as polyethylene oxide and polypropylene oxide; polyamide; polyurethane; and polyurea.

Specific examples of the aliphatic hydrocarbon-based polymer may include a low molecular weight polymer, such as polyisobutylene, polybutene, poly-4-methylpentene, poly-1-octene, and an ethylene/α-olefin copolymer, and hydrogenated products thereof; and a low molecular weight polymer, such as polyisoprene and a copolymer of polyisoprene and butadiene, and hydrogenated products thereof. The aliphatic hydrocarbon-based polymer has a number-average molecular weight of preferably 300 to 5,000.

These polymer plasticizers may be a homopolymer including one type of the repeating unit or a copolymer including a plurality of repeating structural bodies. Further, two or more types of the aforementioned polymers may be used in combination.

The ratio of the plasticizer in the resin composition of the present invention is preferably 0.2 parts by weight or more, more preferably 0.5 parts by weight or more, and further more preferably 1.0 part by weight or more, and is preferably 30 parts by weight or less, more preferably 20 parts by weight or less, and further more preferably 15 parts by weight or less, relative to 100 parts by weight of the hydrogenated block copolymer product [D]. When the ratio of the plasticizer falls within the aforementioned range, the film obtained from such a resin composition can be a film exhibiting a sufficiently low phase difference even after being subjected to an operation in the wet stretching.

[1.9. Optional Component]

The resin composition of the present invention may include an optional component other than the hydrogenated block copolymer product [D] and the plasticizer. Examples of the optional component may include a stabilizer, such as an antioxidant, an ultraviolet absorber, and a light stabilizer; a resin modifier, such as a lubricant; a coloring agent, such as a dye and a pigment; and an antistatic agent. As these additives, one type thereof may be solely used, and two or more types thereof may be also used in combination. The adding amount of the optional component may be appropriately selected within the range that does not impair the purpose of the present invention.

[1.10. Properties]

The resin composition of the present invention has a heat deformation temperature of preferably 115° C. or lower, and more preferably 110° C. or lower. The lower limit of the heat deformation temperature is not particularly limited and it may be set to, for example, 60° C. or higher. When the heat deformation temperature falls within this range, the film obtained from such a resin composition can be a film exhibiting a sufficiently low phase difference even after being subjected to the operation in the wet stretching. The heat deformation temperature may be measured by subjecting the resin composition in a film shape or the like to thermomechanical analysis (TMA). The analysis may be performed by using a thermomechanical analyzer (for example, trade name "TMA/SS7100" manufactured by Seiko Instruments Inc.). The resin composition having such a heat deformation temperature can be easily obtained by adjusting the ratio of the repeating units in the block copolymer [C] and the ratio of the hydrogenated block copolymer product [D] with respect to the plasticizer in the resin composition.

[2. Film [E]]

The film of the present invention is formed from the resin composition of the present invention. For the sake of explanation, in the present application, the film of the present invention may be referred to as a "film [E]" in order to distinguish it from other films in general.

The film [E] may be produced by molding the resin composition of the present invention in a film shape using any molding methods. The molded product may be directly used as the film [E] or optionally further subjected to a stretching treatment to use as the film [E].

Examples of the method for molding the resin composition in the film shape may include a melt extrusion molding method. In the present application, the film that is obtained by the melt extrusion molding method and not subjected to the stretching treatment may be referred to as a "unstretched film" in order to distinguish it from a stretched film. Further, the film obtained by stretching the unstretched film may be referred to as a "stretched film [Es]" in order to distinguish it from other stretched films in general. When used as a material for producing the polarizing plate, it is preferable that the film [E] is an unstretched film.

The melt extrusion step may be carried out by a method in which the resin composition of the present invention is melted in an extruder and extruded in the film shape from a T-die attached to the extruder, and the extruded film is brought in tight contact with one or more cooling rolls for molding and taking up.

Molding conditions for the melt extrusion molding may be appropriately set in accordance with conditions, such as a composition and molecular weight of the resin composition in use. The cylinder temperature of the extruder is preferably 190° C. or higher, and more preferably 200° C. or higher, and is preferably 280° C. or lower, and more preferably 260° C. or lower. The temperature of the cooling roll of a film take-up device is preferably 50° C. or higher, more preferably 70° C. or higher, and is preferably 200° C. or lower, and more preferably 180° C. or lower.

The thickness of the unstretched film may be appropriately set depending on the purpose of use or the like. The thickness of the unstretched film is preferably 5 μm or more, and more preferably 10 μm or more, and is preferably 200 μm or less, and more preferably 150 μm or less. The unstretched film may be wound into a roll shape and then subjected to the subsequent stretching step, or may be directly subjected to the stretching step continued from the melt extrusion step.

As the film [E] of the present invention is a film formed from the resin composition of the present invention, the film [E] can exhibit properties suitable for producing the polarizing plate. For example, the film can be made such that the birefringence thereof expressed as a result of stretching, and tension during stretching are at low levels. Specifically, the film may be a film having either or both of the following properties (E1) and (E2).

Property (E1): The birefringence can be 0.001 or less, preferably 0.0005 or less, the birefringence being expressed by subjecting the film to an free-end uniaxial stretching at a temperature in a range of 50° C. to 100° C. and a stretching ratio in a range of 1.2 to 6.0.

Property (E2): The maximum tension can be 10 N/10 mm or less, preferably 8 N/10 mm or less, the maximum tension being caused by subjecting the film to the free-end uniaxial stretching at a temperature in a range of 50° C. to 100° C. and a stretching ratio in a range of 1.2 to 6.0.

The film [E] having the properties (E1) and (E2) can be easily obtained by adjusting the ratio of the repeating units in the block copolymer [C] and the ratio of the hydrogenated block copolymer product [D] relative to the plasticizer in the resin composition.

"The birefringence can be a specific value or less, the birefringence being expressed by subjecting the film to an free-end uniaxial stretching at a temperature in a range of 50° C. to 100° C. and a stretching ratio in a range of 1.2 to 6.0" means that there are one or more sets of conditions of the temperature and stretching ratio under which the exhibited birefringence can be at the specific value or less when performing a free-end uniaxial stretching at a certain temperature in the range of 50° C. to 100° C. and a certain stretching ratio in the range of 1.2 to 6.0. The lower limit of the birefringence in the property (E1) may be 0.00001. Similarly, "the maximum tension can be a specific value or less, the maximum tension being caused by subjecting the film to a free-end uniaxial stretching at a temperature in a range of 50° C. to 100° C. and a stretching ratio in a range of 1.2 to 6.0" means that there are one or more sets of conditions of the temperature and stretching ratio under which the maximum tension caused by the stretching can be at the specific value or less when performing a free-end uniaxial stretching at a certain temperature in the range of 50° C. to 100° C. and a certain stretching ratio in the range of 1.2 to 6.0. The lower limit of the maximum tension in the property (E2) may be, for example, 0.05 N/10 mm or more.

Also in a case wherein the film [E] of the present invention is the stretched film [Es] that has already been stretched, it is preferable that the stretched film [Es] satisfies either or both of the properties (E1) and (E2). That is, it is preferable that the stretched film [Es] satisfies these properties (E1) and (E2) when the stretched film [Es] is subjected to an additional free-end uniaxial stretching.

The shape and size of the film [E] may be appropriately adjusted depending on a desired use application. When used for producing the polarizing plate, the film [E] is preferably a long-length film from the viewpoint of production efficiency. In a case wherein the film [E] is used as a material for producing the polarizing plate, the thickness of the film [E] is preferably 5 μm or more, and more preferably 10 μm or more, and is preferably 200 μm or less, and more preferably 150 μm or less.

When the film [E] is subjected to the production method of the polarizing plate of the present invention, the film [E] is stretched in a step of the production method of the polarizing plate to become the stretched film [Es].

[2.1. Stretched Film [Es]]

Stretching conditions for stretching the unstretched film to prepare the stretched film [Es] may be appropriately selected so as to obtain the desired stretched film [Es]. Further, in a case wherein the unstretched film is stretched in the step of the production method of the polarizing plate to be the stretched film [Es], the stretching conditions may be appropriately set so as to match preferable conditions under which a material film for a polarizer is stretched to prepare a polarizer in the production method of the polarizing plate.

For example, when the unstretched film is stretched to be the stretched film [Es], the stretching may be performed by any mode, such as uniaxial stretching and biaxial stretching. Further, when the unstretched film is a long-length film, a stretching direction may be any of a longitudinal direction (a direction parallel to a lengthwise direction of the long-length film), a lateral direction (a direction parallel to a width direction of the long-length film), and a diagonal direction (a direction that is neither the lengthwise direction nor the lateral direction). When the stretching is performed together with the material film for a polarizer in the production method of a polarizing plate, the stretching is performed preferably by the uniaxial stretching, further preferably by a free-end uniaxial stretching, and particularly preferably by a free-end uniaxial stretching in the longitudinal direction, from the viewpoint of developing a function as a polarizer. The stretching ratio is preferably 1.3 or more, and more preferably 1.4 or more, and is preferably 5 or less, and more preferably 4 or less. The stretching temperature is preferably 55° C. or higher, and more preferably 60° C. or higher, and is preferably 80° C. or lower, and more preferably 75° C. or lower.

When the stretched film [Es] is used as a protective film for a polarizing plate, a phase difference of the stretched film [Es] is preferably small. Specifically, Re of the stretched film [Es] is preferably 20 nm or less, and more preferably 10 nm or less. The lower limit of Re may be 0 nm. Rth of the film [Es] is preferably −10 nm or more, and more preferably −5 nm or more, and is preferably 10 nm or less, and more preferably 5 nm or less. The film having such a small phase difference even after being subjected to the production step of a polarizer including the wet stretching can be easily obtained by adjusting the ratio of the repeating units in the block copolymer [C] and the ratio of the hydrogenated block copolymer product [D] relative to the plasticizer in the resin composition.

In a case wherein the stretched film [Es] is used as the protective film of the polarizing plate, the thickness of the stretched film [Es] is preferably 5 μm or more, and more preferably 10 μm or more, and is preferably 100 μm or less, and more preferably 50 μm or less. When the thickness of the stretched film [Es] falls within such a range, preferable optical properties and mechanical properties can be easily obtained.

[3. Polarizing Plate]

The polarizing plate of the present invention includes the aforementioned film [E] of the present invention as a protective film.

The polarizing plate usually includes a polarizer and a pair of protective films that protect both surfaces of the polarizer. The polarizing plate of the present invention may have the film [E] as one or both of the pair of protective films.

EXAMPLES

Hereinafter, the present invention will be described in more detail with reference to Examples and Comparative Examples. However, the present invention is not limited to the following Examples. In the following description, "part" and "%" expressing a quantitative ratio of a component are on the basis of weight, unless otherwise specified.

[Evaluation Methods]

[Weight-Average Molecular Weight (Mw) and Molecular Weight Distribution (Mw)/(Mn)]

The molecular weights of the block copolymer and the hydrogenated block copolymer product were measured as a standard polystyrene-equivalent value by GPC at 38° C. using THF as an eluent. As the measurement device, HLC-8020 GPC manufactured by Tosoh Corp. was used.

[Hydrogenation Rate]

The hydrogenation rate of the hydrogenated block copolymer product [D] was calculated from a $^1$H-NMR spectrum or by GPC analysis. The hydrogenation rate in a range of 99% or less was calculated by measuring the $^1$H-NMR spectrum, while the hydrogenation rate in a range exceeding 99% was calculated from a ratio of peak areas detected by a UV detector and an RI detector through the GPC analysis.

Example 1

(1-1. Synthesis of Block Copolymer [C])

In a reaction vessel equipped with a stirrer, in which an internal atmosphere had been sufficiently replaced with nitrogen, 270 parts of dehydrated cyclohexane and 0.59 parts of n-dibutyl ether were charged. 0.63 parts (in terms of an amount of n-butyllithium) of n-butyllithium (15% cyclohexane solution) was further added thereto.

(1-1-1. First Stage of Polymerization)

While the entire volume was stirred at 60° C., 30.0 parts of dehydrated styrene was continuously added to the reaction vessel over 60 minutes to proceed with a polymerization reaction. After the completion of addition, the entire volume was kept stirred for another 20 minutes. The temperature was kept at 60° C. from the start of the first stage of polymerization to the end of the third stage of polymerization. The polymerization conversion rate was measured by subjecting the reaction liquid to gas chromatography and it was 99.5% at this time point.

[1-1-2. Second Stage of Polymerization]

Subsequently, a mixture of 21.0 parts of dehydrated styrene and 19.0 parts of isoprene was continuously added to the reaction liquid over 150 minutes. After the completion of addition, the mixture was kept stirred for another 20 minutes. The polymerization conversion rate was 99.5% at this time point.

[1-1-3. Third Stage of Polymerization]

Subsequently, 30.0 parts of dehydrated styrene was continuously added to the reaction liquid over 60 minutes. After the completion of addition, the liquid was kept stirred for another 20 minutes. The polymerization conversion rate was almost 100% at this time point. At this time point, 0.5 parts of isopropyl alcohol was added to the reaction liquid to terminate the reaction. In this manner, a mixture containing the block copolymer [C] was obtained. The resulting block copolymer [C] had a weight-average molecular weight (Mw) of 68,100, a molecular weight distribution (Mw/Mn) of 1.03, wA:wB=60:40, and w[IB]:w[IIB]=53:47.

[1-2. Hydrogenated Product [D]]

The mixture containing the block copolymer [C] obtained in (1-1-3) was transferred to a pressure-resistant reaction vessel equipped with a stirrer. Then, 7.0 parts of a nickel catalyst supported on a diatomaceous earth carrier (product name "product name "E22U" manufactured by JGC Catalysts and Chemicals Ltd., content ratio of supported nickel: 60%) as a hydrogenation catalyst and 80 parts of dehydrated cyclohexane were added to the mixture and mixed therewith. The atmosphere inside the reaction vessel was replaced with hydrogen gas. The hydrogen gas was further supplied to the solution while the solution was stirred to perform a hydrogenation reaction at a temperature of 190° C. and a pressure of 4.5 MPa for 6 hours.

After the completion of hydrogenation reaction, the reaction solution was filtered to remove the hydrogenation catalyst. Then, 1.0 part of a xylene solution prepared by dissolving 0.1 parts of pentaerythrityl tetrakis[3-(3,5-di-t-butyl-4-hydroxyphenyl)propionate] (product name "Songnox 1010" manufactured by KOYO Chemical Research Center), which was a phenol-based antioxidant, was added to the filtrate and dissolved therein.

Subsequently, the solvents cyclohexane and xylene, and other volatile components were removed from the aforementioned solution at a temperature of 260° C. and a pressure of 0.001 MPa or less using a cylindrical evaporator (product name "Kontro" manufactured by Hitachi Ltd.) to obtain a molten polymer. The molten polymer was successively filtered at a temperature of 260° C. using a polymer filter connected to the evaporator. As the polymer filter, a polymer filter provided with a stainless steel sintered filter having a pore diameter of 20 μm (manufactured by Fuji Filter Mfg. Co., Ltd.) was used. After filtration, the molten polymer was extruded from a die in a strand shape, cooled, and cut into a pellet shape using a pelletizer to obtain 91 parts of pellets of the hydrogenated block copolymer product [D]. The resulting hydrogenated block copolymer product [D] had a weight-average molecular weight of 71,400, a molecular weight distribution (Mw/Mn) of 1.06, and the hydrogenation rate was almost 100%.

(1-3. Resin Composition)

100 parts of the pellets of the hydrogenated block copolymer product [D] obtained in (1-2) and 5 parts of a plasticizer (trade name "ADEKACIZER PN260" manufactured by ADEKA Corp.) were mixed by a twin-screw extruder to obtain a resin composition.

(1-4. Unstretched Film)

The resin composition obtained in (1-3) was supplied to a hot melt extrusion film-molding machine equipped with a T-die. The resin composition was extruded from the T-die and wound into a roll at a take-up speed of 4 m/min to mold the resin composition. In this manner, a long-length unstretched film (a thickness of 50 μm) formed from the resin composition was obtained.

(1-5. Measurement of Heat Deformation Temperature)

The unstretched film obtained in (1-4) was cut to obtain a rectangular sample in a size of 5 mm×20 mm. The sample was subjected to the thermomechanical analysis (TMA) TMA was performed under an increasing temperature condition from 20° C. to 180° C. at a rate of 5° C./min with a tensile loading method using a thermomechanical analyzer (trade name "TMA/SS7100" manufactured by Seiko Instruments Inc.). A distortion inflection point obtained as a result of measurement was adopted as the heat deformation temperature of the unstretched film.

(1-6. Evaluation of Stretchability)

The unstretched film obtained in (1-5) was cut to obtain a rectangular sample in a size of 70 mm short edge×90 mm long edge. The short edges of the sample were fixed with clips and the sample was subjected to free-end stretching in a long-edge direction. The stretching was performed at 60° C. under a condition of stretching a length of the long edge by 3.0 times. For evaluation, the film that was not ruptured was evaluated as "good" and the film that was ruptured was evaluated as "poor". Further, the tension required in stretching was measured to record the maximum tension.

(1-7. Measurement of Birefringence)

After the sample was stretched in (1-6), the in-plane retardation Re was measured using a phase difference meter (trade name "Mueller matrix polarimeter (Axo Scan)" manufactured by Opto Science, Inc.). The measuring wavelength was set to 590 nm in this measurement. The birefringence was obtained by dividing the in-plane retardation thus obtained by a thickness of the sample in a measurement position. Further, the thickness direction retardation Rth was also measured.

Example 2

A resin composition and a film were obtained and evaluated in the same manner as that in Example 1 except that the used amount of the plasticizer in (1-3) was changed to 10 parts.

Example 3

A resin composition and a film were obtained and evaluated in the same manner as that in Example 1 except that, in (1-3), the type of the plasticizer was changed to polybutene (manufactured by NOF Corp., trade name "NOF Polybutene 10SH"), and the used amount of the plasticizer was changed to 10 parts.

Example 4

A resin composition and a film were obtained and evaluated in the same manner as that in Example 1 except that, in (1-3), the type of the plasticizer was changed to polybutene (manufactured by NOF Corp., trade name "NOF Polybutene 10SH"), and the used amount of the plasticizer was changed to 15 parts.

Comparative Example 1

A resin composition and a film were obtained and evaluated in the same manner as that in Example 1 except that no plasticizer was used in (1-3).

Results of Examples and Comparative examples are summarized in Table 1.

TABLE 1

|  | Ex. 1 | Ex. 2 | Ex. 3 | Ex. 4 | Comp. Ex. 1 |
|---|---|---|---|---|---|
| Plasticizer type | Alkyl ester | Alkyl ester | Poly-butene | Poly-butene | None |
| Plasticizer adding amount[1]) | 5 | 10 | 10 | 15 | — |
| Heat deformation temperature | 150° C. | 92° C. | 100° C. | 92° C. | 124° C. |
| Stretchability | Good | Good | Good | Good | Poor |
| Birefringence (60° C. free-end 1.5 times) | 0.00015 | 0.00008 | 0.00010 | 0.00008 | Not stretch-able |
| Maximum tension | 5.4N/ 10 mm | 3.0N/ 10 mm | 3.4N/ 10 mm | 3.0N/ 10 mm |  |
| Re | 6 nm | 3 nm | 4 nm | 3 nm |  |
| Rth | 0 nm | 0 nm | 0 nm | 0 nm |  |

[1])Adding amount of the hydrogenated block copolymer product [D] relative to 100 parts of the pellets (unit: part).

The results in Table 1 demonstrate that the film formed from the resin composition of the present invention has a low softening temperature and favorable stretchability, and exhibits a low birefringence by stretching. Thus the film can be usefully used in the method for producing a polarizing plate in which the film is co-stretched with the material film for polarizer.

The invention claimed is:

1. A film formed from a resin composition comprising a hydrogenated block copolymer product [D] and a plasticizer, wherein:
   the hydrogenated block copolymer product [D] is a hydrogenated block copolymer product obtained by hydrogenating a block copolymer [C], the block copolymer [C] being composed of
   a polymer block [A] containing a repeating unit [I] derived from an aromatic vinyl compound as a main component, and
   a polymer block [B] containing the repeating unit [I] derived from an aromatic vinyl compound and a repeating unit [II] derived from a chain conjugated diene compound as main components;
   (i) a ratio (wA/wB) of wA to wB is 45/55 to 85/15 where the wA is a weight fraction of the polymer block [A] in the block copolymer block [C] and the wB is a weight fraction of the polymer block [B] in the block copolymer block [C];
   (ii) a ratio (w[IB]/w[IIB]) of w[IB] to w[IIB] is 40/60 to 55/45 where the w[IB] is a weight fraction of the repeating unit [I] in the polymer block [B] and the w[IIB] is a weight fraction of the repeating unit [II] in the polymer block [B]; and
   (iii) in the hydrogenated block copolymer product [D], 90% or more of all unsaturated bonds in the block copolymer [C] are hydrogenated; and
   the film is a stretched film having Re of 20 nm or less, and Rth of −10 nm or more and 10 nm or less.

2. The film according to claim 1, wherein the resin composition has a heat deformation temperature of 115° C. or lower.

3. The film according to claim 1, wherein the plasticizer is an ester-based plasticizer, an aliphatic hydrocarbon-based polymer or a mixture thereof.

4. The film according to claim 1, wherein a birefringence is 0.001 or less, the birefringence being expressed by subjecting the film to a free-end uniaxial stretching at a temperature in a range of 50° C. to 100° C. and a stretching ratio in a range of 1.2 to 6.0.

5. The film according to claim 1, wherein a maximum tension is 10 N/10 mm or less, the maximum tension being caused by subjecting the film to a free-end uniaxial stretching at a temperature in a range of 50° C. to 100° C. and a stretching ratio in a range of 1.2 to 6.0.

6. A polarizing plate comprising a film as a protective film, the film being formed from a resin composition comprising a hydrogenated block copolymer product [D] and a plasticizer, wherein:

the hydrogenated block copolymer product [D] is a hydrogenated block copolymer product obtained by hydrogenating a block copolymer [C], the block copolymer [C] being composed of a polymer block [A] containing a repeating unit [I] derived from an aromatic vinyl compound as a main component, and a polymer block [B] containing the repeating unit [I] derived from an aromatic vinyl compound and a repeating unit [II] derived from a chain conjugated diene compound as main components;

(i) a ratio (wA/wB) of wA to wB is 45/55 to 85/15 where the wA is a weight fraction of the polymer block [A] in the block copolymer block [C] and the wB is a weight fraction of the polymer block [B] in the block copolymer block [C];

(ii) a ratio (w[IB]/w/[IB]) of w[IB] to w[IIB] is 40/60 to 55/45 where the w[IB] is a weight fraction of the repeating unit [I] in the polymer block [B] and the w[IIB] is a weight fraction of the repeating unit [II] in the polymer block [B]; and (iii) in the hydrogenated block copolymer product [D], 90% or more of all unsaturated bonds in the block copolymer [C] are hydrogenated.

7. The polarizing plate according to claim 6, wherein the resin composition has a heat deformation temperature of 115° C. or lower.

8. The polarizing plate according to claim 6, wherein the plasticizer is an ester-based plasticizer, an aliphatic hydrocarbon-based polymer or a mixture thereof.

9. The polarizing plate according to claim 6, wherein the film is a stretched film.

10. The polarizing plate according to claim 6, wherein a birefringence of the film is 0.001 or less, the birefringence being expressed by subjecting the film to a free-end uniaxial stretching at a temperature in a range of 50° C. to 100° C. and a stretching ratio in a range of 1.2 to 6.0.

11. The polarizing plate according to claim 6, wherein a maximum tension of the film is 10 N/10 mm or less, the maximum tension being caused by subjecting the film to a free-end uniaxial stretching at a temperature in a range of 50° C. to 100° C. and a stretching ratio in a range of 1.2 to 6.0.

* * * * *